United States Patent
Zhou et al.

(10) Patent No.: US 9,195,896 B2
(45) Date of Patent: Nov. 24, 2015

(54) METHODS AND SYSTEMS FOR IMAGE RECOGNITION

(71) Applicant: TENCENT TECHNOLOGY (SHENZHEN) COMPANY LIMITED, Shenzhen (CN)

(72) Inventors: Demao Zhou, Shenzhen (CN); Bin Xiao, Shenzhen (CN); Keren Li, Shenzhen (CN); Pinlin Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/278,435

(22) Filed: May 15, 2014

(65) Prior Publication Data
US 2015/0016670 A1    Jan. 15, 2015

Related U.S. Application Data (63) Continuation of application No. PCT/CN2013/087372, filed on Nov. 19, 2013.

(30) Foreign Application Priority Data

Jul. 10, 2013    (CN) .......................... 2013 1 0288861

(51) Int. Cl.
G06K 9/00    (2006.01)
(52) U.S. Cl.
CPC .................................. G06K 9/00973 (2013.01)
(58) Field of Classification Search
CPC .......................... G06K 9/00973; G06K 9/00624
See application file for complete search history.

(56) References Cited

U.S. PATENT DOCUMENTS

| | | | | |
|---|---|---|---|---|
| 8,903,138 | B1* | 12/2014 | Steffens et al. | 382/118 |
| 2010/0034468 | A1* | 2/2010 | Boncyk et al. | 382/217 |
| 2010/0260426 | A1* | 10/2010 | Huang et al. | 382/218 |
| 2012/0296754 | A1* | 11/2012 | Boncyk et al. | 705/26.1 |

(Continued)

FOREIGN PATENT DOCUMENTS

| | | |
|---|---|---|
| CN | 1860788 A | 11/2006 |
| CN | 1914611 A | 2/2007 |
| CN | 1972186 A | 5/2007 |

(Continued)

OTHER PUBLICATIONS

The World Intellectual Property Organization (WIPO) International Search Report for PCT/CN2013/087372 Apr. 3, 2014.

(Continued)

*Primary Examiner* — Utpal Shah
*Assistant Examiner* — Pinalben Patel
(74) *Attorney, Agent, or Firm* — Anova Law Group, PLLC (57) ABSTRACT

A method and system for image recognition are disclosed. The method includes the steps of acquiring image information for a target object to be recognized at a terminal device; transferring said image information to a server, wherein the server applies feature recognition techniques to the image information, and returns a recognition result; and presenting the recognition result returned by the server at the terminal device. The method and system consistent with the present disclosure may simplify user operations and improve the efficiency and intelligence level of an image recognition system.

20 Claims, 7 Drawing Sheets

(56) References Cited

U.S. PATENT DOCUMENTS

| | | | |
|---|---|---|---|
| 2013/0088337 A1* | 4/2013 | Blanchflower et al. | 340/384.1 |
| 2014/0059037 A1* | 2/2014 | Swaminathan et al. | 707/713 |

FOREIGN PATENT DOCUMENTS

| | | |
|---|---|---|
| CN | 101373514 A | 2/2009 |
| CN | 101807241 A | 8/2010 |
| CN | 102591366 A | 7/2012 |
| CN | 103150904 A | 6/2013 |
| CN | 103167082 A | 6/2013 |
| TW | 201303752 A1 | 1/2013 |
| TW | M457241 U1 | 7/2013 |

OTHER PUBLICATIONS

The State Intellectual Property Office of the People's Republic of China (SIPO) Office Action 1 for 201310288861.X Aug. 4, 2015.
Taiwan Intellectual Property Office (TIPO) Office Action 1 for 103121636 Jul. 16, 2015.

\* cited by examiner

METHODS AND SYSTEMS FOR IMAGE RECOGNITION

CROSS-REFERENCES TO RELATED APPLICATIONS

Related Applications

This application is a continuation application of PCT Patent Application No. PCT/CN2013/087372, filed on Nov. 19, 2013, which is based upon and claims the benefit of priority from Chinese Patent Application No. 201310288861.x, filed Jul. 10, 2013, the entire contents of which are incorporated herein by reference.

FIELD OF THE INVENTION

The present disclosure relates to image recognition technologies. In particular, the present disclosure relates to an image recognition method, and a system, terminal device, and server for image recognition.

BACKGROUND image recognition processes often include the following steps. First, a user may submit image information related to a target object to be recognized. Second, the user may manually identify the category of the target object. Finally, in the selected object category, based on the image information, the system may then generate a recognition result. Current image recognition technologies often require manual interventions and complicated user operations. Such shortcomings may impair the efficiency and the intelligence level of the image recognition system.

The disclosed method and system are directed to solve one or more problems set forth above and other problems.

BRIEF SUMMARY OF THE DISCLOSURE

Embodiments consistent with the present disclosure provide a method, system, terminal device, or a server for image recognition. Embodiments consistent with the present disclosure further improve the intelligence level of the image recognition system, and thus avoid complicated user manual operations in the image recognition process.

One aspect of the present disclosure provides a method for image recognition implemented on a terminal device. The method may include the steps of acquiring image information for a target object to be recognized and transferring said image information to a server. The server may apply feature recognition techniques to the image information, and return a recognition result. The method may further include presenting the recognition result returned by the server.

Another aspect of the present disclosure provides a method for image recognition implemented on a server. The method may include the steps of receiving, from a terminal device, image information for a target object to be recognized; applying feature recognition techniques to the image information; obtaining a recognition result; and transferring the recognition result to the terminal device.

Another aspect of the present disclosure provides an image recognition system. The system may include an acquisition module configured to acquire image information for a target object to be recognized and a recognition module configured to transfer the image information to a server. The server may apply feature recognition techniques to the image information, and return a recognition result. The system may further include an output module configure to present the recognition result returned by the server.

Another aspect of the present disclosure provides another image recognition system. The system may include a receiving module that receives image information for a target object to be recognized from a terminal device; a recognition module that applies feature recognition techniques to obtain a recognition result; and a result returning module that returns the recognition result to the terminal device.

Embodiments consistent with the present disclosure may acquire image information for a target object to be recognized automatically, and apply feature recognition techniques to obtain recognition results to improve the intelligence level of the image recognition system, and to avoid complicated user manual operations in the image recognition process.

Other aspects of the present disclosure can be understood by those skilled in the art in light of the description, the claims, and the drawings of the present disclosure.

BRIEF DESCRIPTION OF THE DRAWINGS

To illustrate embodiments of the invention, the following are a few drawings illustrating embodiments consistent with the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some of the embodiments of the present invention, but not all embodiments. Based on the disclosed embodiment, persons of ordinary skill in the art may derive other embodiments consistent with the present disclosure, all of which are within the scope of the present invention.

In the embodiments consistent with the present disclosure, a terminal device may include, but are not limited to a PC (Personal Computer), a PAD (tablet PC), a mobile phone, a smart phone, a notebook computer, and other devices. Image information may be any data elucidating an object. A target object may be any object that is described by the image information. Image information may be static information, which reflects the data elucidating an object at one instance of time. Image information may also be dynamic information, which reflects the data elucidating an abject for a period of time. In the embodiments consistent with the present disclosure, an image recognition system may analyze and process image information to detect or recognize the target object.

An image capturing application may be any software or hardware application that can obtain image information. An image capturing application may include an interface that enables a user to obtain image information. A user may use an image capturing application on a terminal device, such as a video camera application on a smartphone, from time to time to collect image information and invoke the image recognition process. The image recognition process may be implemented as a function of the image capturing application or a separate application.

Figure 11:
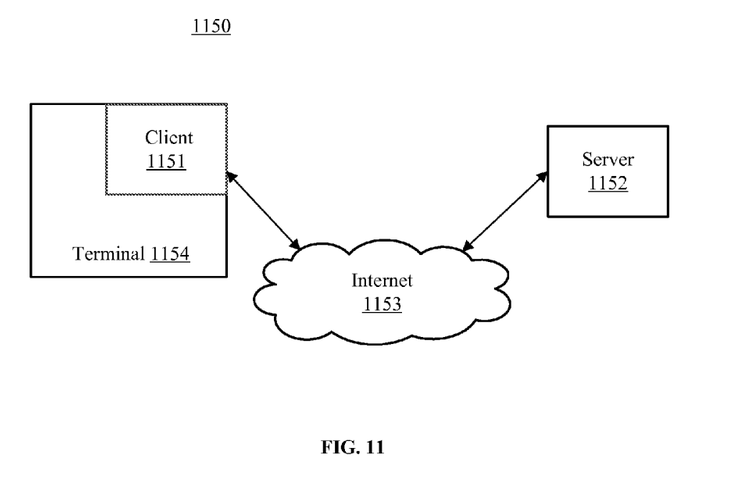
FIG. 11 illustrates an exemplary operating environment incorporating certain disclosed embodiments.

FIG. 11 illustrates an exemplary operating environment 1150 incorporating certain disclosed embodiments. As shown in FIG. 11, environment 1150 may include a terminal 1154, the Internet 1153, and a server 1152. The Internet 1153 may include any appropriate type of communication network for providing network connections to the terminal 1154 and the server 1152. For example, Internet 1153 may include the Internet or other types of computer networks or telecommunication networks, either wired or wireless.

A server, as used herein, may refer to one or more server computers configured to provide certain functionalities, which may require any user accessing the services to authenticate to the server before the access. A server may also include one or more processors to execute computer programs in parallel.

The server 1152 may include any appropriate server computers configured to provide certain server functionalities, such as storing image information captured by a user through an image capturing application or implementing an image recognition process. Although only one server is shown, any number of servers can be included. The server 1152 may be operated in a cloud or non-cloud computing environment.

Terminal 1154 may include any appropriate type of mobile computing devices or terminal devices, such as mobile phones, smart phones, tablets, notebook computers, or any type of computing platform. Terminal 1154 may be referred to as a terminal device. Terminal 1154 may include one or more clients 1151. The client 1151, as used herein, may include any appropriate mobile application software, hardware, or a combination of application software and hardware to achieve certain client functionalities. For example, client 1151 may include an image capturing application such as a video camera or a photo camera application. Although only one client 1151 is shown in the environment 1150, any number of clients 1151 may be included.

Figure 12:
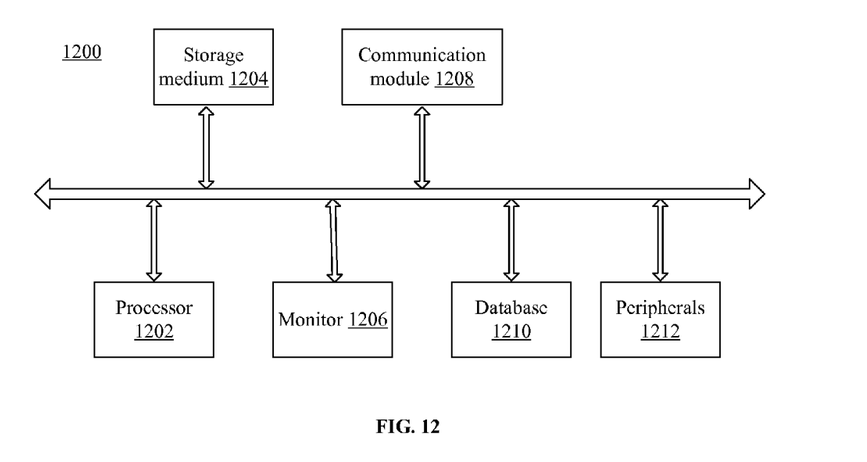
FIG. 12 illustrates a block diagram of an exemplary computer system consistent with the disclosed embodiments.

Terminal 1154 and/or server 1152 may be implemented on any appropriate computing platform. FIG. 12 illustrates a block diagram of an exemplary computer system 1200 capable of implementing terminal 1154 and/or server 1152.

As shown in FIG. 12, computer system 1200 may include a processor 1202, a storage medium 1204, a monitor 1206, a communication module 1208, a database 1210, and peripherals 1212. Certain devices may be omitted and other devices may be included.

Processor 1202 may include any appropriate processor or processors. Further, processor 1202 can include multiple cores for multi-thread or parallel processing. Storage medium 1204 may include memory modules, such as Read-only memory (ROM), Random Access Memory (RAM), flash memory modules, and erasable and rewritable memory, and mass storages, such as CD-ROM, U-disk, and hard disk, etc. Storage medium 1204 may store computer programs for implementing various processes, when executed by processor 1202.

Further, peripherals 1212 may include I/O devices such as keyboard and mouse, and communication module 1208 may include network devices for establishing connections through the communication network. Database 1210 may include one or more databases for storing certain data and for performing certain operations on the stored data, such as database searching.

In operation, terminals/clients 1154/1151 or servers 1152 may send image information or image recognition results to each other.

Figure 1:
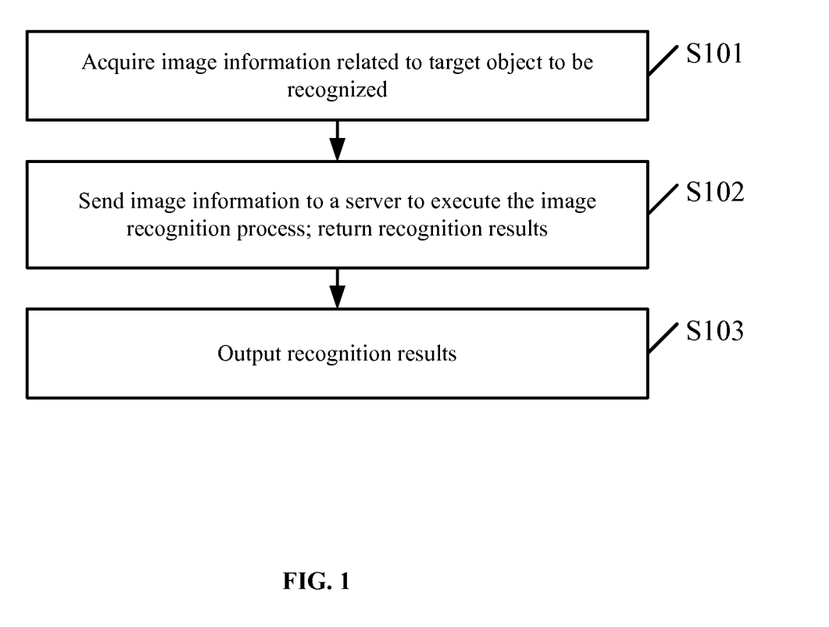
FIG. 1 is a flowchart of an exemplary image recognition method consistent with the present disclosure.
Figure 2:
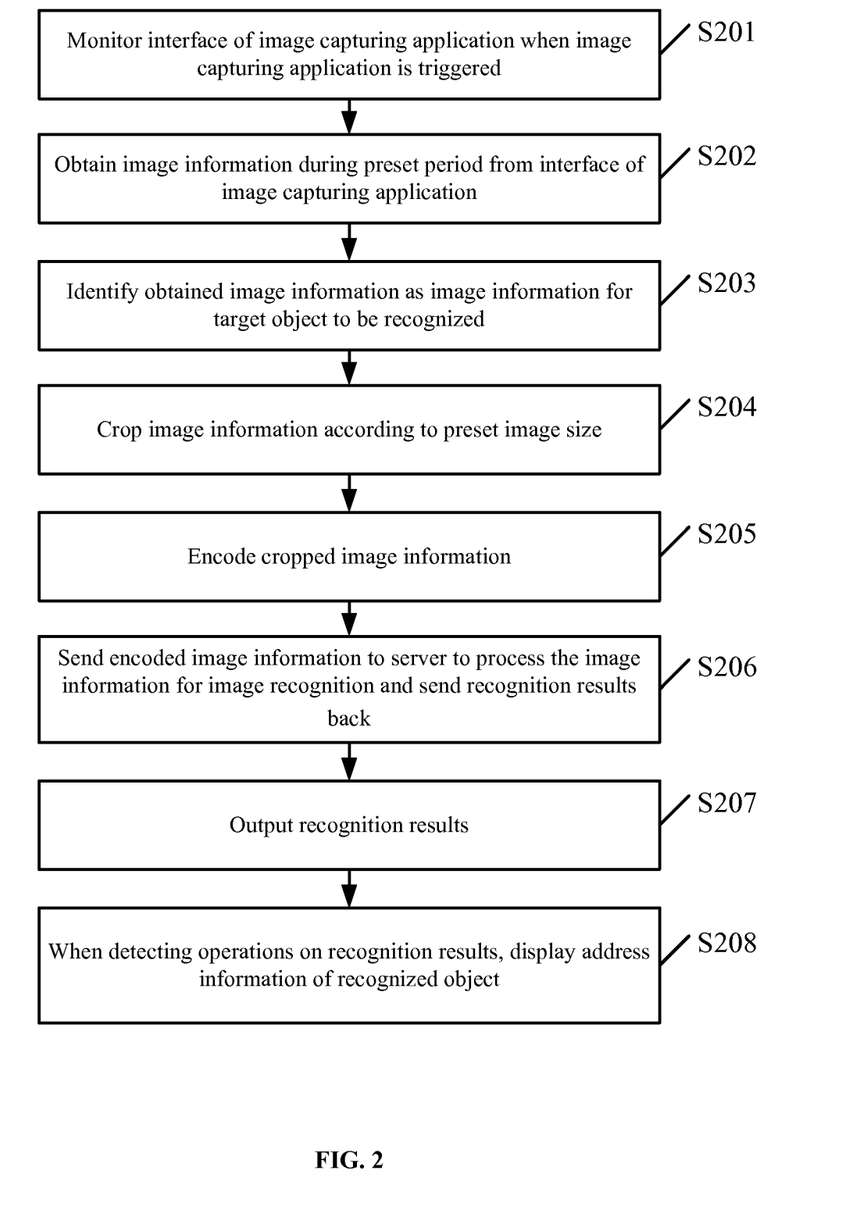
FIG. 2 is another flowchart of an exemplary image recognition method consistent with the present disclosure.

FIGS. 1 and 2 describe an embodiment of an image recognition system and related methods in detail. It should be noted that FIGS. 1 and 2 show the flow charts of the image recognition method executed by an image recognition system. The image recognition system may be installed in a terminal device.

FIG. 1 shows a flowchart of an image recognition method. The method may comprise steps S101-S103. In step S101, an image recognition system may acquire image information related to a target object to be recognized. In this step, the image recognition system may use an image capturing application, such as a video camera application, or a photo camera application, etc., to collect the image information for a target object to be recognized.

In step S102, the image recognition system may send the image information to the server so that the server may execute the image recognition process. The server may then return the recognition results. The server may apply feature recognition techniques to process feature information related to the target object to be recognized.

The feature recognition techniques may refer to the techniques that analyze and use the feature information in the image information to recognize the target object. Feature information may be information that describes one or more characteristics of the target object. Feature information may also be information describing one or more unique characteristics of the target object, or describing a combination of unique characteristics of the target object. Feature information may further be information describing a combination of unique and non-unique characteristics of the target object. Feature information may also describe the relationship(s) between one or more, or a combination of, characteristics of the target object. Moreover, feature information may be information describing one or more, or a combination of, characteristics of the target object at one instance of time or over a period of time. Feature information may further describe the relationship(s) between one or more, or a combination of, characteristics of the target object at one instance of time or over a period of time.

In step S103, the server may output the recognition result to the user. The recognition results may include profile information and address information included in the image information. The address information may be the target object's purchase address information. For example, using the address information, a user may reach a detailed purchasing interface for the target object. It can be understood that once the recognition results are presented to a user, the user may then act on the recognition results. For example, a user may view the object profile information included in the image information, click the address information included in the image information, or use a browser to open up a page using the address information included in the image information.

FIG. 2 shows an image recognition method implemented by an embodiment consistent with the present disclosure. The method may comprise steps S201-S208. In step S201, the image recognition system may monitor the interface of an image capturing application when the image capturing application is activated.

The image capturing application may be installed on a terminal device. The image capturing application may include, but are not limited to, video camera applications, photo camera applications, and other applications. When the image capturing application is activated, the interface of the image capturing application, such as a video recording application interface, is activated. The target object's image information would appear in the image capturing application's interface once the interface has been activated. It can be understood that if an image capturing application's record/capture button were triggered, for example, if a user presses the button to take a photo, the static target image information would appear in the image capturing application's interface. If the image capturing application's recording button were not triggered, the application may capture dynamic image information through the interface. In this embodiment, in order to improve the intelligence level of the image recognition system, and to avoid complicated user manual operations, preferably, in this step, the system may monitor the dynamic image information in the interface of the image capturing application when the record/capture button is not triggered.

In step S202, the image recognition system may obtain image information during a preset period from the interface of the image capturing application. The preset period can be defined as needed. For example, you can set a default period as 5 s, 10 s, and so on. Because the image capturing application monitors dynamic image information, in this step, the system may obtain the dynamic image information for a preset period. For example, assuming the default period is 5 s, in step S201, when the image capturing application is initiated, the application may monitor the image information captured through the video camera application interface. In this step, the image recognition system may obtain the dynamic image information from the said interface of the image capturing application for 5 seconds. After 5 seconds, the image recognition system may stop acquiring the image information from the said interface.

In addition, the preset period can be determined based on various criteria to optimize the image recognition process. For example, the preset period may be set to optimize the accuracy of the image recognition results, or to optimize system performance of the image recognition system.

In step 203, the image recognition system may identify the obtained image information as image information for a target object to be recognized.

Steps S201-S203 may be detailed steps of step 101 shown in FIG. 1. In this embodiment, the image capturing application may specify that the image information for a target object to be recognized is the dynamic image information obtained for the preset period, instead of the image information obtained from the image capturing application's interface for a longer period. By defining the preset period, the image recognition system ensures that the image recognition process goes smoothly, with high efficiency, and without wasting resources to process unnecessary image information.

In step S204, the image recognition system may crop the image information according to a preset image size. In step S205, the image recognition system may encode the cropped image information.

Steps S204 and S205 may be examples of the steps taken during the pretreatment process of the image information. In this process, the preset image size can be defined as needed. For example, a user can set the default image size as "220 pixels (height)*320 pixels (width) with a resolution of 350 dpi." Alternatively, the user can set the default image size as "441 pixels (height)*311 pixels (width) with a resolution of 360 dpi," and so on.

The size of the image information for the preset period obtained from the image capturing application's interface may be inconsistent. For example, within the preset period, a user may have adjusted the image properties, e.g., the focal length or backlighting, such that the specifications of the image information recorded during the preset time are not uniform. In step S204, the system may crop the inconsistent image information so that the image information obtained for the preset period would be of a consistent size. Because the cropped image information needs to be transferred to the server for recognition, in step S205, the system may encode the image information that was cropped in the previous step. This encoding process may improve the data transfer efficiency and save network resources consumed by the data transfer.

In addition, the preset image size can be determined based on various criteria to optimize the image recognition process. For example, the preset image size may be set to optimize the accuracy of the image recognition results, or to optimize system performance of the image recognition system.

In step S206, the system may send the encoded image information to the server so that the server can process the image information for image recognition and send the recognition results back. The server may apply feature recognition techniques to process feature information related to the target object to be recognized.

The feature recognition techniques may refer to the techniques that analyze and use the feature information in the image information to recognize the target object. Feature information may be information that describes one or more characteristics of the target object. Feature information may also be information describing one or more unique characteristics of the target object, or describing a combination of unique characteristics of the target object. Feature information may further be information describing a combination of unique and non-unique characteristics of the target object. Feature information may also describe the relationship(s) between one or more, or a combination of, characteristics of the target object. Moreover, feature information may be information describing one or more, or a combination of, characteristics of the target object at one instance of time or over a period of time. Feature information may further describe the relationship(s) between one or more, or a combination of, characteristics of the target object at one instance of time or over a period of time.

In step S206, once the server receives the encoded image information, it may first decode the image information. This decoding process is the inverse of the encoding step S205. In some embodiments, the server may first use feature recognition techniques to obtain the features from the decoded image information. The feature recognition techniques may include, but are not limited to, SIFT (scale-invariant feature transform), SURF (speeded up robust features), etc. The server may then compare the recognized features with the features defined in a pre-programmed object feature template. Based on the result of the comparison, the server may generate the recognition results.

In step 207, the server may output the recognition results. The recognition results may include profile information and address information included in the image information. The address information may be the target object's purchase address information. Using the address information, a user may reach a detailed purchasing interface for the target object. It can be understood that once the recognition results are presented, a user may then act on the recognition results. For example, a user may view the object profile information included in the image information, click the address information included in the image information, or use a browser to open up a page using the address information included in the image information.

In step S208, when the system detects that a user has initiated operations on the recognition results, the system may display the address information of the recognized object, which may link to an interface with more detailed information. The user-initiated operations may include, but are not limited to, clicking on the image information containing the address information of the target object, and using a browser to open up a page using the address information included in the image information. In this step, when the system detects that a user has initiated operations on the recognition results, the system may display address information of the recognized object, which may link to the interface with more detailed information. In this example, the detailed purchase page of the recognized object may be displayed to better market the recognized object.

In FIGS. 1 and 2, embodiments consistent with the present disclosure may acquire image information for a target object to be recognized automatically, and then apply feature recognition techniques to obtain recognition results to improve the intelligence level of the image recognition system, and to avoid complicated user manual operations in the image recognition process.

Figure 3:
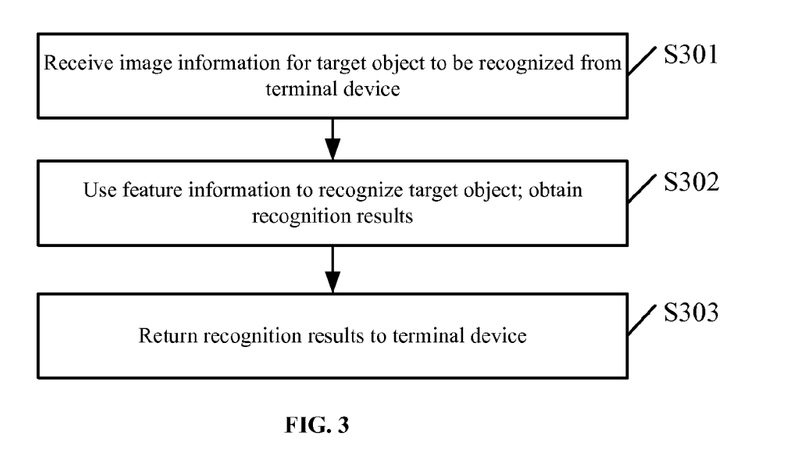
FIG. 3 is another flowchart of an exemplary image recognition method consistent with the present disclosure.
Figure 4:
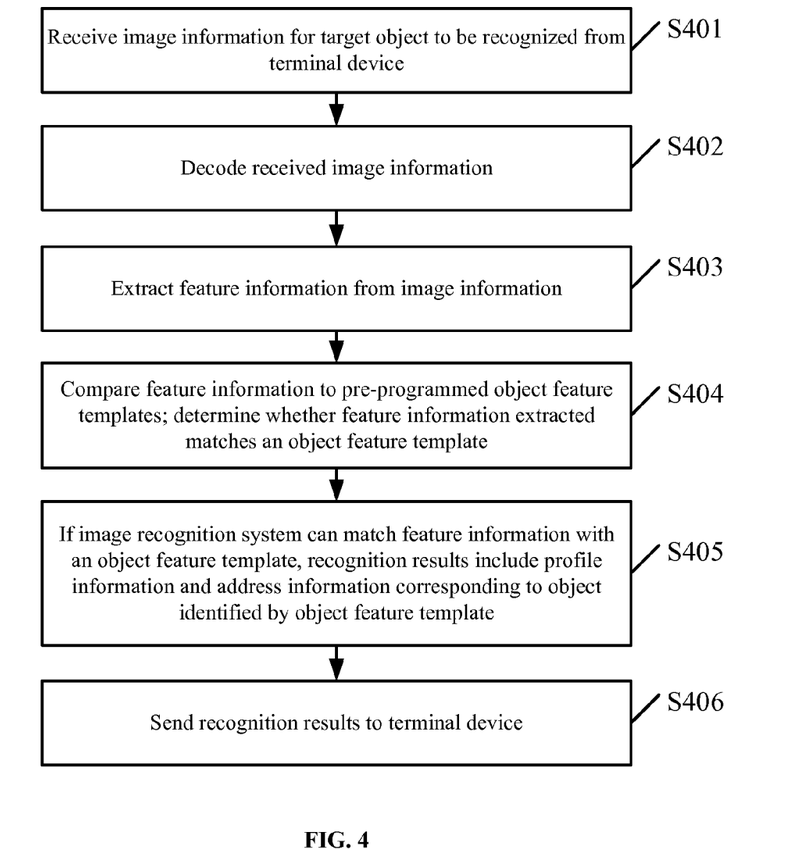
FIG. 4 is another flowchart of an exemplary image recognition method consistent with the present disclosure.

FIGS. 3 and 4 show an image recognition method used by the embodiments consistent with the present disclosure. The method shown in FIGS. 3 and 4 may be implemented by a system of image recognition, with the recognition system installed in a server.

FIG. 3 shows the flow chart of an image recognition method used by one of the embodiments consistent with the present disclosure. The method includes steps S301-S303 as described below.

In step S301, an image recognition system may receive image information for a target object to be recognized from a terminal device. The image information for a target object to be recognized may be obtained from the interfaces of an image capturing application of the terminal device, such as a video camera or a camera application on a smartphone.

In step S302, the image recognition system may use feature information to recognize the target object. The image recognition system may obtain the recognition results. In this step, the image recognition system may apply feature recognition techniques to process feature information related to the target object to be recognized.

The feature recognition techniques may refer to the techniques that analyze and use the feature information in the image information to recognize the target object. Feature information may be information that describes one or more characteristics of the target object. Feature information may also be information describing one or more unique characteristics of the target object, or describing a combination of unique characteristics of the target object. Feature information may further be information describing a combination of unique and non-unique characteristics of the target object. Feature information may also describe the relationship(s) between one or more, or a combination of, characteristics of the target object. Moreover, feature information may be information describing one or more, or a combination of, characteristics of the target object at one instance of time or over a period of time. Feature information may further describe the relationship(s) between one or more, or a combination of, characteristics of the target object at one instance of time or over a period of time.

In step S303, the image recognition system may return the recognition results to the terminal device. The recognition results may include profile information and address information included in the image information. The address information may be the target object's purchase address information. Using the address information, a user may reach a detailed purchasing interface for the target object. It can be understood that once the recognition results are sent to the terminal device by the server, as described in this step, the terminal device may output the recognition results. A user may then act on the recognition results. For example, a user may view the object profile information included in the image information, click the address information included in the image information, or use a browser to open up a page using the address information included in the image information.

FIG. 4 shows the flow chart of an image recognition method used by one of the embodiments consistent with the present disclosure. The method includes steps S401-S406 as described below.

In step S401, an image recognition system may receive the image information for a target object to be recognized from a terminal device. Step S401 may be the same as step S301, the descriptions of which are not repeated here.

In step S402, the image recognition system may decode the received image information. To improve the efficiency of the image information transfer and save network resources used by the transfer, the terminal device may pretreat the obtained image information, including cropping and encoding the image information. In this step, once the image recognition system receives the image information for a target object to be recognized from the terminal device, the system may decode the information. The decoding process is the inverse of the encoding process applied by the terminal device.

In step S403, the image recognition system may extract feature information from the image information. In this step, the system may use image recognition techniques to extract information from the decoded image information. Such techniques may include, but are not limited to, SIFT and SURF technologies.

In step S404, the image recognition system may compare the feature information to pre-programmed object feature templates. The image recognition system may then determine whether the feature information extracted matches an object feature template.

The features matching an object feature template may denote the situation in which the features of the image information are the same as those in an object feature template. For example, if the feature information from the image information can be expressed as an eigenvector K1, and a book's object feature template can be expressed as eigenvector K1, then the feature information matches that book's object feature template.

The features matching an object feature template may also denote the situation in which the features of the image information and the object feature template match to a certain extent. For example, assuming the matching threshold is set to be 80%, if the feature information from the image information can be expressed as an eigenvector K2, and K2 includes five eigenvalues; and a CD cover's object feature template can be expressed as eigenvector K3, and K3 includes five eigenvalues. If K2 and K3 have more than four of the same eigenvalues, then the feature information matches the CD cover's object feature template to more than 80%, which means the feature information matches the CD cover's object feature template.

In step S405, if the image recognition system can match the feature information with an object feature template, the recognition results may be profile information and address information corresponding to the object identified by the object feature template. In this step, if the image recognition system can match the feature information with an object feature template, the recognition results may be the profile information and address information corresponding to the object identified by the object feature template.

For example, if the feature information included in the image information matches a book's object feature template, then the system may conclude that a target object in the image information may be that book. In this step, the system may consider the profile information and the address information of the book the recognition results. In another example, if the feature information matches the CD cover's object feature template, the system may conclude that a target object in the image information may be the CD cover. In this step, the system may consider the profile information and the address information of the CD cover the recognition results. It can be understood that, if in step S404, the image recognition system determines that there is no object feature template that matches the feature information in the image information, the recognition process has failed. In this case, the system may return a recognition failure message to the terminal device.

In step S406, the image recognition system may send recognition results to the terminal device. Step S406 may be the same as step S303, the descriptions of which are not repeated here.

The embodiments such as those described in FIGS. 3-4 implement the image recognition method in the image recognition system of the server. To improve the efficiency of image recognition, parallel processes may be used in these embodiments. For example, a plurality of image recognition systems may be installed in a server to execute the image recognition process in parallel. In addition, multiple servers can be used with one image recognition system installed in each server. In this case, image recognition systems from different servers may execute the image recognition processes in parallel.

Figure 5:
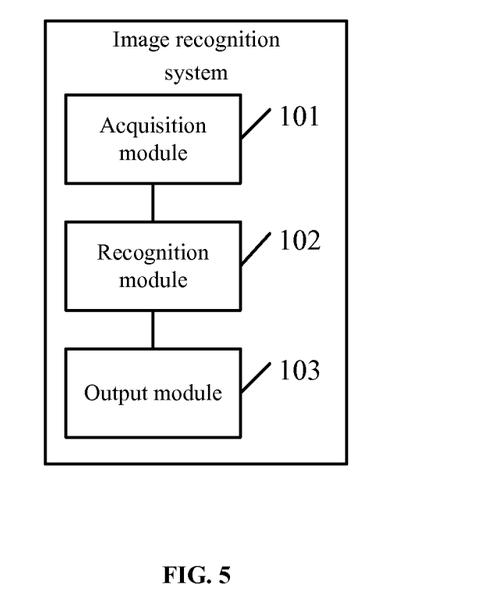
FIG. 5 is a block diagram of an exemplary image recognition system consistent with the present disclosure.
Figure 6:
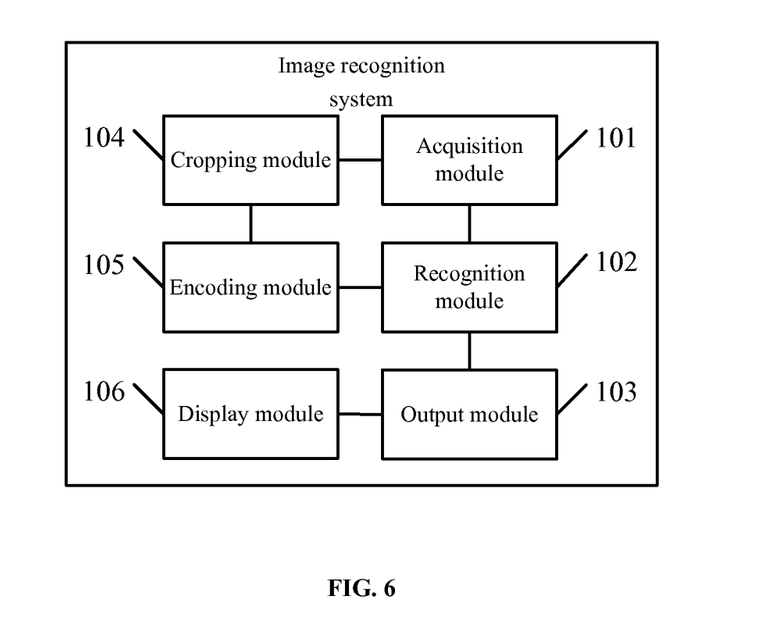
FIG. 6 is another block diagram of an exemplary image recognition system consistent with the present disclosure.
Figure 7:
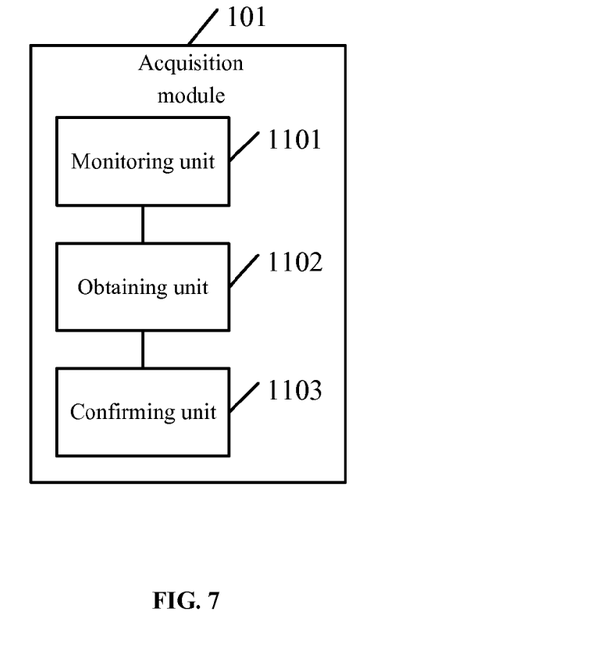
FIG. 7 is a block diagram of an exemplary acquisition module consistent with the present disclosure.

Below, FIGS. 5-7 show the structure of an embodiment of an image recognition system. It should be noted that the image recognition system shown in FIGS. 5-7 may be installed in the client module, such as an instant message client module, a SNS (Social Networking Services) client module, etc. These embodiments may implement the methods described in relation to FIGS. 1-2. For the convenience of description, the following description only focuses on certain embodiments consistent with the present disclosure. Other details that are not described below may be found in the implementations of the embodiments described in relation to FIGS. 1-2.

FIG. 5 shows a block diagram of an image recognition system used by embodiments consistent with the present disclosure. The image recognition system may include an acquisition module 101, a recognition module 102, and an output module 103.

The acquisition module 101 may collect the image information for a target object to be recognized. The acquisition module 101 may use the terminal device's image capturing applications, such as video camera applications, photo camera applications and other applications, to collect image information for a target object to be recognized from the applications' interfaces.

The recognition module 102 may send said image information to the server so that the server may identify feature information in the image information, and return the recognition results. In this step, the image recognition system may apply feature recognition techniques to process feature information related to the target object to be recognized.

The feature recognition techniques may refer to the techniques that analyze and use the feature information in the image information to recognize the target object. Feature information may be any information that describes one or more characteristics of the target object. Feature information may also be information describing one or more unique features of the target object, or describing a combination of unique features of the target object. Feature information may further be information describing a combination of unique and non-unique features of the target object. Feature information may also describe the relationship(s) between one or more, or a combination of, features of the target object. Moreover, feature information may be information describing one or more, or a combination of, characteristics of the target object over a period of time. Feature information may further describe the relationship(s) between one or more, or a combination of, characteristics of the target object over a period of time.

The output module 103 may output the recognition results returned by the server. The recognition results may include the profile information and the address information included in the image information. The address information may be the target object's purchase address information. Using the address information, a user may reach a detailed purchasing interface for the target object. It can be understood that once the recognition results are presented, a user may then act on the recognition results. For example, a user may view the object profile information included in the image information, click the address information included in the image information, or use a browser to open up a page using the address information included in the image information.

FIG. 6 shows a block diagram of an image recognition system used by embodiments consistent with the present disclosure. The image recognition system may include an acquisition module 101, a recognition module 102, and an output module 103. The image recognition system may also include a cropping module 104, an encoding module 105, and a display module 106.

The cropping module 104 may crop the image information according to a preset image size. The encoding module 105 may encode the cropped image information. The processes implemented by the cropping module 104 and encoding module 105 may be the modules implementing the pretreatment process for the image information. The preset image size may be determined by actual needs, such as image size consistency or system optimization.

For example, a preset image size may be "220 pixels (height)*320 pixels (width) with a resolution of 350 dpi", or, a user can set the preset image size as "441 pixels (height) *311 pixels (width) resolution of 360 dpi," etc. Because the size of the image information that is obtained for a preset period from the image capturing application interface may be inconsistent, the cropping module 104 may crop the image information to fit the preset image size so that the image information for the preset period is consistent. In this example, within the preset time a user may have adjusted the properties of the image capturing application such as the focal length or backlighting. As a result, the specifications of the image information may not be uniform. Because the cropped image information needs to be transferred to the server to be processed, to improve the efficiency of the data transfer and save network resources, encoding module 105 may encode the cropped image information.

In addition, the preset image size can be determined based on various criteria to optimize the image recognition process. For example, the preset image size may be set to optimize the accuracy of the image recognition results, or to optimize system performance of the image recognition system.

When a user initiates certain operations using the recognition results, the display module 106 may display the target object's address information included in the image information, such as detailed pages, which the address information is linked to.

The user-initiated operations may include, but are not limited to, clicking the object's address information in the image information, or using a browser to open pages linked to the object's address information, etc. The display module 106 may detect a user-initiated operation and then display the detailed pages linked to the object's address information. For example, the display module 106 may display a detailed purchasing interface, which may be conducive to precision marketing.

FIG. 7 shows a block diagram of an acquisition module used by embodiments consistent with the present disclosure. The acquisition module 101 may include a monitoring unit 1101, an obtaining unit 1102, and a confirming unit 1103.

The monitoring unit 1101 may monitor the image capture application's interface when the image capturing process is initiated. The image capturing application may be installed in a terminal device. The image capturing applications may include, but are not limited to, video camera applications, photo camera applications, and other applications. When an image capturing application is activated, the interface of the image capturing application, such as the interface of a video recording application, is activated. The target object's image information would appear in the image capturing application's interface once the interface has been activated. It can be understood that if an image capturing application's record/capture button were triggered, for example, if a user presses the button to take a photo, the static target image information would appear in the camera application interface. If the image capturing application's recording button were not triggered, the application may capture dynamic image information through the interface. In this embodiment, in order to improve the intelligence level of the image recognition system, and to avoid complicated user manual operations, preferably, in this step, the system may monitor the dynamic image information in the image capturing application's interface when the record/capture button is not triggered.

The obtaining unit 1102 may obtain the image information for the preset period from the interface of the image capturing application. The preset period can be set defined as needed. For example, you can set the preset period to 5 s, 10 s, and so on. Because the image capturing application monitors the dynamic image information, in this step, the system may obtain the dynamic image information for a preset time period. For example, assuming the preset time is 5 s, when the image capturing application is initiated, the application monitors the image information captured through the camera application interface for 5 seconds. After 5 seconds, the image capturing system may stop acquiring the image information from the said image capturing interface.

In addition, the preset period can be determined based on various criteria to optimize the image recognition process. For example, the preset period may be set to optimize the accuracy of the image recognition results, or to optimize system performance of the image recognition system.

The confirming unit 1103 may confirm that the obtained image information is the image information for a target object to be recognized. The process implemented by the monitoring unit 1101, obtaining unit 1102 and confirming unit 1103 may be referred to as the image acquisition process. It should be noted that in this embodiment, the image capturing application may specify that the image information for a target object to be recognized is the dynamic image information obtained for the preset period, instead of the image information obtained from the interface of the image capturing application for a longer period. By defining the preset period, the image recognition system may ensure that the image recognition process goes smoothly, with high efficiency, and without wasting resources to process unnecessary image information.

Embodiments consistent with the present disclosure also disclose a terminal device. The terminal device may include an image recognition system. The structure of the image recognition system can be found in the description of the embodiment shown in FIGS. 5-7. It should be noted that the terminal device may implement the methods described in the present disclosure. Embodiments consistent with the present disclosure may acquire image information for a target object to be recognized automatically, and then apply feature recognition techniques to obtain recognition results to improve the intelligence level of the image recognition system, and to avoid complicated user manual operations.

Figure 8:
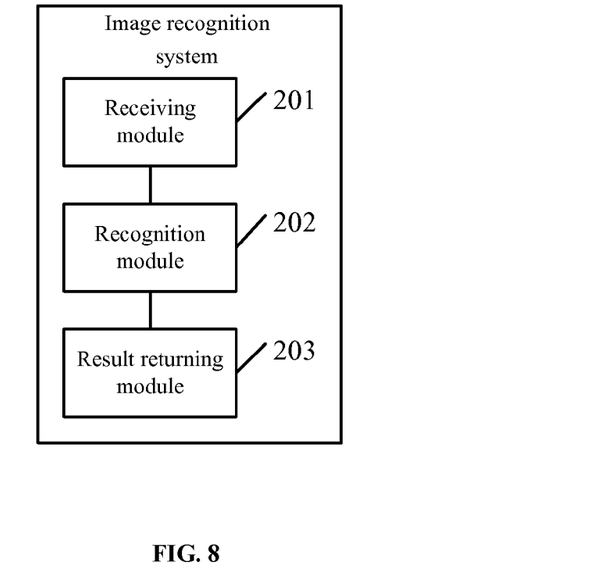
FIG. 8 is another block diagram of an exemplary image recognition system consistent with the present disclosure.
Figure 9:
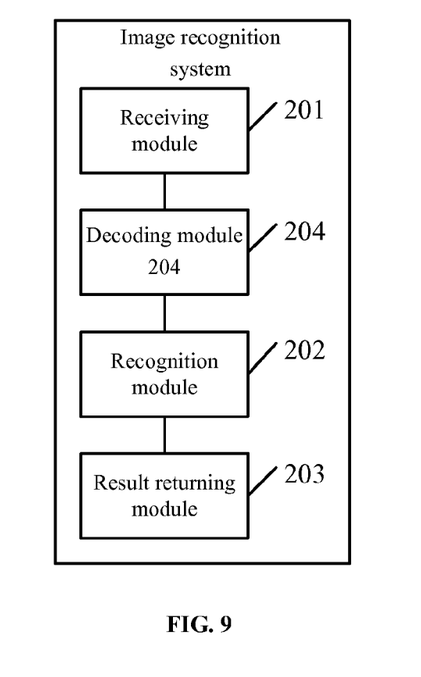
FIG. 9 is another block diagram of an exemplary image recognition system consistent with the present disclosure.
Figure 10:
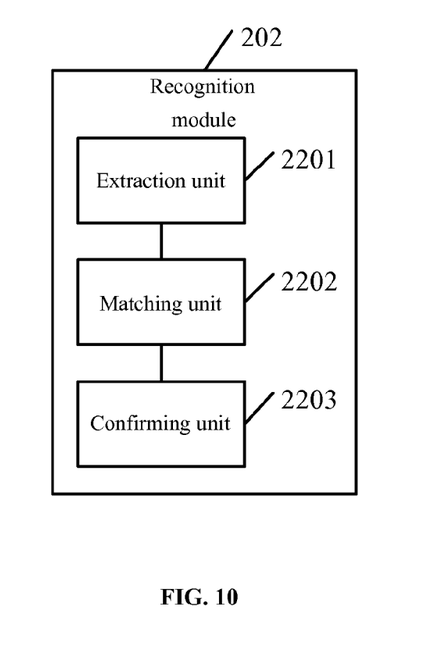
FIG. 10 is a block diagram of a recognition module consistent with the present disclosure.

Below, FIGS. 8-10 show the structure of an embodiment of the image recognition system. It should be noted that the image recognition system shown in FIGS. 8-10 may be installed in a server to implement the methods described in relationship to FIGS. 3-4. For the convenience of description, the following description only focuses on certain embodiments. Other details not described below may be found in the implementation of the embodiments shown in FIGS. 3-4.

FIG. 8 shows a block diagram of an image recognition system used by embodiments consistent with the present disclosure. The image recognition system may include a receiving module 201, a recognition module 202, and a result returning module 203.

The receiving module 201 may receive the image information for a target object to be recognized from the terminal device. The image information for a target object to be recognized may be the image information obtained from the image capturing application's interface. The image capturing applications may be video or photo camera applications. The receiving module 201 may receive the image information from the terminal device.

The recognition module 202 may recognize the image information to obtain recognition results. The recognition module 202 may obtain the recognition results. In this step, the recognition module 202 may apply feature recognition techniques to process feature information related to the target object to be recognized.

The feature recognition techniques may refer to the techniques that analyze and use the feature information in the image information to recognize the target object. Feature information may be information that describes one or more characteristics of the target object. Feature information may also be information describing one or more unique characteristics of the target object, or describing a combination of unique characteristics of the target object. Feature information may further be information describing a combination of unique and non-unique characteristics of the target object. Feature information may also describe the relationship(s) between one or more, or a combination of, characteristics of the target object. Moreover, feature information may be information describing one or more, or a combination of, characteristics of the target object at one instance of time or over a period of time. Feature information may further describe the relationship(s) between one or more, or a combination of, characteristics of the target object at one instance of time or over a period of time.

The result returning module 203 may return recognition results to the terminal device. The recognition results may include profile information and address information included in the image information. The address information may be the target object's purchase address information. Using the address information, a user may reach a detailed purchasing interface for the target object. It can be understood that once the recognition results are presented, a user may then act on the recognition results. For example, a user may view the object profile information included in the image information, click the address information included in the image information, or use a browser to open up a page using the address information included in the image information.

FIG. 9 shows a block diagram of an image recognition system used by embodiments consistent with the present disclosure. The device may include a receiving module 201, a recognition module 202, and a result returning module 203. The device may also include a decoding module 204.

The receiving module 201, recognition module 202, and result returning module 203 have been discussed in relation to FIG. 8. The decoding module 204 may decode the received image information.

To improve the efficiency of the image information transfer and save network resources used by the transfer, the terminal device may pretreat the obtained image information, including cropping and encoding the image information. In this step, once the image recognition system receives the image information for a target object to be recognized from the terminal device, the system may decode the information. The decoding process is the inverse of the encoding process applied by the terminal device.

FIG. 10 shows a block diagram of a recognition module used by embodiments consistent with the present disclosure. The recognition module 202 may include an extraction unit 2201, a matching unit 2202, and a confirming unit 2203.

The extraction unit 2201 may extract the feature information from the image information. The extraction unit 2201 may use image recognition techniques to extract information from the decode image information. Such techniques may include, but are not limited to, SIFT and SURF technologies. The matching unit 2202 may compare the extracted feature information to pre-programmed object feature templates. The matching unit 2202 may then determine whether an object feature template matches the extracted features.

The extracted features matching an object feature template may refer to the situation in which the features of the image information are the same as the object feature template. For example, if the feature information from the image information can be expressed as an eigenvector K1, and a book's object feature template can be expressed as eigenvector K1, then the feature information matches that book's object feature template.

The features matching an object feature template may also refer to the situation in which the features of the image information and the object feature template match to a certain extent. For example, assuming the matching threshold is 80%, if the feature information from the image information can be expressed as an eigenvector K2, and K2 includes five eigenvalues; and a CD cover's object feature template can be expressed as eigenvector K3, and K3 includes five eigenvalues. If K2 and K3 have more than four of the same eigenvalues, then the feature information matches the CD cover's object feature template to more than 80%, which means the feature information matches the CD cover's object feature template.

If the extracted feature information matches an object feature template, the confirming module 2203 may identify the recognition results to be the profile information and address information corresponding to the object identified by the object feature template. For example, if the feature information included in the image information matches a book's object feature template, then the system may conclude that a target object in the image information may be that book. In this step, the system may consider the profile information and the address information of that book the recognition results. In another example, the feature information matches the CD cover's object feature template, and then the system may conclude that a target object in the image information may be that CD cover. In this step, the system may consider the profile information and the address information of the CD cover the recognition results. It is understood that, if the image recognition system determines that there is no object feature template that matches the extracted feature information, then the recognition process has failed. In this embodiment, the system may return a recognition failure message to the terminal device.

In FIGS. 8-10, embodiments consistent with the present disclosure may acquire image information for a target object to be recognized automatically, and then apply feature recognition techniques to obtain recognition results to improve the intelligence level of the image recognition system, and to avoid complicated user manual operations.

The embodiments such as those described in FIGS. 8-10 implement the image recognition method in the image recognition system of the server. To improve the efficiency of image recognition, parallel process may be used in these embodiments. For example, a plurality of image recognition systems may be included in a server to execute the recognition process in parallel. In addition, multiple servers can be used with one image recognition system in each server. In this case, image recognition systems from different servers may execute the recognition process in parallel.

The embodiments consistent with the present disclosure also disclose a server that may include one or more image recognition systems. The structure of the image recognition system is discussed in relation to the embodiments shown in FIGS. 8-10, the descriptions of which are not repeated here. The disclosed server may implement the methods disclosed in the present disclosure. Embodiments consistent with the present disclosure may acquire image information for a target object to be recognized automatically, and then apply feature recognition techniques to obtain recognition results to improve the intelligence level of the image recognition system, and to avoid complicated user manual operations.

Consistent with embodiments of the present disclosure, one or more non-transitory storage medium storing a computer program are provided to implement the system and method for image recognition. The one or more non-transitory storage medium may be installed in a computer or provided separately from a computer. A computer may read the computer program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be semiconductor storage medium, such as DRAM, SRAM, EPROM, EEPROM, flash memory, or memory stick.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and systems, various image recognition systems may be implemented. For example, a user may capture image information for a target object to be recognized through a video camera application on a smartphone. The user may initiate the image recognition process, which may be a function in the video camera application or a separate software application. The image recognition system may compare the feature information included in the image information with object feature templates. The image recognition system may identify the target object corresponding to a matched object feature template and generate a recognition result. The image recognition system may further display the recognition result on the smartphone.

What is claimed is:

1. A method for image recognition implemented on a terminal device having an image capturing application, comprising:
   acquiring image information for a target object to be recognized at the terminal device;
   transferring said image information to a server wherein the server applies feature recognition techniques to the image information, and returns a recognition result; and
   presenting the recognition result returned by the server on the terminal device;
   wherein the server applying feature recognition techniques to the image information further comprises:
      extracting feature information from the image information, including expressing the feature information by a first eigenvector;
      comparing the feature information to a preset object feature template, wherein the preset object feature template is expressed by a second eigenvector;
      when the first eigenvector and the second eigenvector have same size and a number percentage of same eigenvalues in the first eigenvector and the second eigenvector reaches a matching threshold, determining that the feature information matches the preset object feature template; and
      identifying the recognition result when the feature information matches the preset object feature template, wherein the recognition result comprises profile information and address information corresponding to an object identified by the preset object feature template.

2. The method according to claim 1, further comprising:
   cropping the image information according to a preset image size; and
   encoding the cropped image information,
   wherein the transferring step comprises transferring the encoded cropped image information to the server.

3. The method according to claim 1, wherein acquiring the image information for a target object to be recognized comprises:
   monitoring an interface of the image capturing application;
   acquiring the image information for a preset time period from the interface of the image capturing application; and
   specifying the acquired image information for the preset time period as the image information for a target object to be recognized.

4. The method according to claim 3, wherein the recognition result comprises profile information and address information included in the image information.

5. The method according to claim 4, further comprising:
   displaying a detailed interface linked to the address information when an operation is initiated based on the recognition result.

6. A method for image recognition implemented on a server, comprising:
   receiving, from a terminal device, image information for a target object to be recognized;
   applying feature recognition techniques to the image information;
   obtaining a recognition result; and
   transferring the recognition result to the terminal device;
   wherein applying feature recognition techniques to the image information further comprises:
      extracting feature information from the image information, including expressing the feature information by a first eigenvector;
      comparing the feature information to a preset object feature template, wherein the preset object feature template is expressed by a second eigenvector;
      when the first eigenvector and the second eigenvector have same size and a number percentage of same eigenvalues in the first eigenvector and the second eigenvector reaches a matching threshold, determining that the feature information matches the preset object feature template; and
      identifying the recognition result when the feature information matches the preset object feature template, wherein the recognition result comprises profile information and address information corresponding to an object identified by the preset object feature template.

7. The method according to claim 6, further comprising:
   decoding the image information; and
   applying feature recognition techniques to the image information to obtain the recognition result.

8. An image recognition system, comprising:
   an acquisition module configured to acquire image information for a target object to be recognized;
   a recognition module configured to transfer the image information to a server, wherein the server applies feature recognition techniques to the image information, and returns a recognition result; and
   an output module configured to present the recognition result returned by the server;

wherein the server applying feature recognition techniques to the image information further comprises:

extracting feature information from the image information, including expressing the feature information by a first eigenvector;

comparing the feature information to a preset object feature template, wherein the preset object feature template is expressed by a second eigenvector;

when the first eigenvector and the second eigenvector have same size and a number percentage of same eigenvalues in the first eigenvector and the second eigenvector reaches a matching threshold, determining that the feature information matches the preset object feature template; and identifying the recognition result when the feature information matches the preset object feature template, wherein the recognition result comprises profile information and address information corresponding to an object identified by the preset object feature template.

9. The image recognition system according to claim 8, further comprising:

a cropping module configured to crop the image information according to a preset image size; and an encoding module configured to encode the cropped image information.

10. The image recognition system according to claim 8, the acquisition module comprising:

a monitoring unit configured to monitor an interface of an image capturing application;

an obtaining unit configured to acquire the image information for a preset time period from the interface of the image capturing application; and a confirming unit configured to specify the acquired image information for the preset time period as the image information for a target object to be recognized.

11. The image recognition system according to claim 10, wherein the recognition result comprises profile information and address information included in the image information.

12. The image recognition system according to claim 11, further comprising:

a displaying module configured to display a detailed interface linked to the address information when an operation is initiated based on the recognition result.

13. The image recognition system according to claim 11, wherein the image recognition system is installed in a terminal device.

14. An image recognition system, comprising:

a receiving module configured to receive image information for a target object to be recognized from a terminal device;

a recognition module configured to apply feature recognition techniques to obtain a recognition result; and a result returning module configured to return the recognition result to the terminal device;

wherein recognition module comprises:

an extracting unit configured to extract feature information from the image information, including expressing the feature information by a first eigenvector;

a matching unit configured to:

match the feature information to a preset object feature template, wherein the preset object feature template is expressed by a second eigenvector; and when the first eigenvector and the second eigenvector have same size and a number percentage of same eigenvalues in the first eigenvector and the second eigenvector reaches a matching threshold, determine that the feature information matches the preset object feature template; and a confirming unit configured to specify profile information and address information corresponding to the object identified by the object feature template as the recognition result when the feature information matches the preset object feature template.

15. The image recognition system according to claim 14, further comprising:

a decoding module configured to decode the received image information.

16. The image recognition system according to claim 15, wherein the image recognition system is installed in a server.

17. The method according to claim 1, wherein the matching threshold is 80%.

18. The image recognition system according to claim 8, wherein the matching threshold is 80%.

19. The method according to claim 6, wherein the matching threshold is 80%.

20. The image recognition system according to claim 14, wherein the matching threshold is 80%.

* * * * *